US010591726B2

(12) United States Patent
Ji

(10) Patent No.: US 10,591,726 B2
(45) Date of Patent: Mar. 17, 2020

(54) APPARATUS AND METHOD FOR CONTROLLING DISPLAY OF HOLOGRAM, VEHICLE SYSTEM

(71) Applicants: Hyundai Motor Company, Seoul (KR); Kia Motors Corporation, Seoul (KR)

(72) Inventor: Sang Woo Ji, Yongin-si (KR)

(73) Assignees: Hyundai Motor Company, Seoul (KR); Kia Motor Company, Seoul (KR)

(*) Notice: Subject to any disclaimer, the term of this patent is extended or adjusted under 35 U.S.C. 154(b) by 0 days.

(21) Appl. No.: 15/802,289

(22) Filed: Nov. 2, 2017

(65) Prior Publication Data

US 2018/0335626 A1    Nov. 22, 2018

(30) Foreign Application Priority Data

May 18, 2017    (KR) .................. 10-2017-0061442

(51) Int. Cl.
| | |
|---|---|
| *G02B 27/01* | (2006.01) |
| *B60K 37/06* | (2006.01) |
| *B60W 50/08* | (2020.01) |
| *B60K 35/00* | (2006.01) |
| *G05D 1/00* | (2006.01) |
| *B60W 50/14* | (2020.01) |

(52) U.S. Cl.
CPC .......... *G02B 27/0103* (2013.01); *B60K 35/00* (2013.01); *B60K 37/06* (2013.01); *B60W 50/082* (2013.01); *G02B 27/0179* (2013.01); *G05D 1/0061* (2013.01); *B60K 2370/1464* (2019.05); *B60K 2370/155* (2019.05); *B60K 2370/1531* (2019.05); *B60W 2050/146* (2013.01); *B60W 2540/04* (2013.01); *G02B 2027/014* (2013.01); *G02B 2027/0141* (2013.01); *G02B 2027/0183* (2013.01)

(58) Field of Classification Search
None
See application file for complete search history.

(56) References Cited

U.S. PATENT DOCUMENTS

| | | | |
|---|---|---|---|
| 6,059,063 A * | 5/2000 | Shimizu ............. | B62D 15/0285 180/204 |
| 2006/0139711 A1 * | 6/2006 | Leister ................. | G03H 1/0808 359/9 |

(Continued)

*Primary Examiner* — Christopher J Kohlman
(74) *Attorney, Agent, or Firm* — Morgan, Lewis & Bockius LLP

(57) ABSTRACT

A hologram display control apparatus may include a determination device turning on a hologram display control depending on an input signal of a user, a hologram projection device projecting a first hologram image corresponding to an image of a manipulating device of a steering wheel onto a first area predefined based on a space coordinate system of a vehicle, when the hologram display control is turned on, a detector recognizing a set operation in a second area predefined for operation recognition with respect to button manipulation in the first hologram image, a manipulation button recognizing device recognizing a manipulation button in the first hologram image based on a location at which the set operation is recognized by the detector, and a signal processing device transmitting a control signal to a driving device of the vehicle operated by the manipulation button.

26 Claims, 12 Drawing Sheets

(56) References Cited

U.S. PATENT DOCUMENTS

| | | | | |
|---|---|---|---|---|
| 2014/0156133 A1* | 6/2014 | Cullinane | ............. | B60W 30/00 |
| | | | | 701/23 |
| 2015/0185858 A1* | 7/2015 | Nagara | ................... | G06F 3/017 |
| | | | | 715/863 |
| 2017/0253191 A1* | 9/2017 | Nash | ....................... | B60K 37/06 |
| 2018/0052541 A1* | 2/2018 | Hoggarth | .................. | G06T 7/70 |

* cited by examiner

APPARATUS AND METHOD FOR CONTROLLING DISPLAY OF HOLOGRAM, VEHICLE SYSTEM

CROSS-REFERENCE TO RELATED APPLICATION

The present application claims priority to Korean Patent Application No. 10-2017-0061442, filed on May 18, 2017, the entire contents of which is incorporated herein for all purposes by this reference.

BACKGROUND OF THE INVENTION

Field of the Invention

The present invention relates to an apparatus and a method for controlling a hologram display, and a vehicle system.

Description of Related Art

Even though a user does not manipulate a vehicle, an autonomous driving control system of a vehicle refers to a system that automatically controls the driving of the vehicle depending on the preset condition.

In addition, the steering wheel of the vehicle includes a manipulating unit that includes one or more buttons for controlling a part of a function of the vehicle to improve convenience of user manipulation while driving. Accordingly, the user may easily control a part of the function of the vehicle while driving by manipulating a button included in the manipulating unit of the steering wheel without manipulating a button included in an instrument panel.

However, if the vehicle enters an autonomous driving mode or an automatic parking mode, since the steering wheel is automatically manipulated under control of the autonomous driving control system or an automatic parking control system, it is not easy to manipulate the manipulating unit included in the steering wheel rotating left/right.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an apparatus and a method for controlling a hologram display and a vehicle system that provide a hologram image associated with a manipulating device of the steering wheel, when a mode for automatic control of the steering wheel of a vehicle is entered, and recognize the manipulated button through recognizing an operation, easily manipulating a button included in the steering wheel even during automatic control of the steering wheel.

Various aspects of the present invention provide an apparatus and a method for controlling a hologram display and a vehicle system that allow the visibility of a user to increase by providing each of the hologram image associated with the manipulating device of the steering wheel and a hologram image corresponding to a cluster screen when the mode for automatic control of the steering wheel of the vehicle is entered.

The technical problems to be solved by the present inventive concept are not limited to the aforementioned problems, and any other technical problems not mentioned herein will be clearly understood from the following description by those skilled in the art to which the present invention pertains.

According to an exemplary embodiment of the present invention, a hologram display control apparatus includes a determination device turning on a hologram display control function depending on an input signal of a user, a hologram projection device projecting a first hologram image corresponding to an image of a manipulating device of a steering wheel onto a first area predefined based on a space coordinate system of a vehicle, when the hologram display control function is turned on, a detector recognizing a set operation in a second area predefined for operation recognition with respect to button manipulation in the first hologram image, a manipulation button recognizing device recognizing a manipulation button in the first hologram image based on a location at which the set operation is recognized by the detector, and a signal processing device transmitting a control signal to a driving device of the vehicle operated by the manipulation button.

According to another exemplary embodiment of the present invention, a hologram display control method includes turning on a hologram display control function depending on an input signal of a user, projecting a first hologram image corresponding to an image of a manipulating device of a steering wheel onto a first area predefined based on a space coordinate system of a vehicle, when the hologram display control function is turned on, recognizing a set operation in a second area predefined for operation recognition with respect to button manipulation in the first hologram image, recognizing a manipulation button in the first hologram image based on a location at which the set operation is recognized, and transmitting a control signal to a driving device of the vehicle operated by the manipulation button.

According to another exemplary embodiment of the present invention, a vehicle system includes one or more driving devices driven by a manipulating device included in a steering wheel of a vehicle and a hologram display control apparatus that projects a hologram image corresponding to an image of the manipulating device of the steering wheel onto a first area predefined based on a space coordinate system of the vehicle after a hologram display control function is turned on depending on an input signal of a user, recognizes a manipulation button in the hologram image depending on whether a set operation is recognized in a second area predefined to include the first area, and transmits a control signal to the driving devices driven by the manipulation button.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
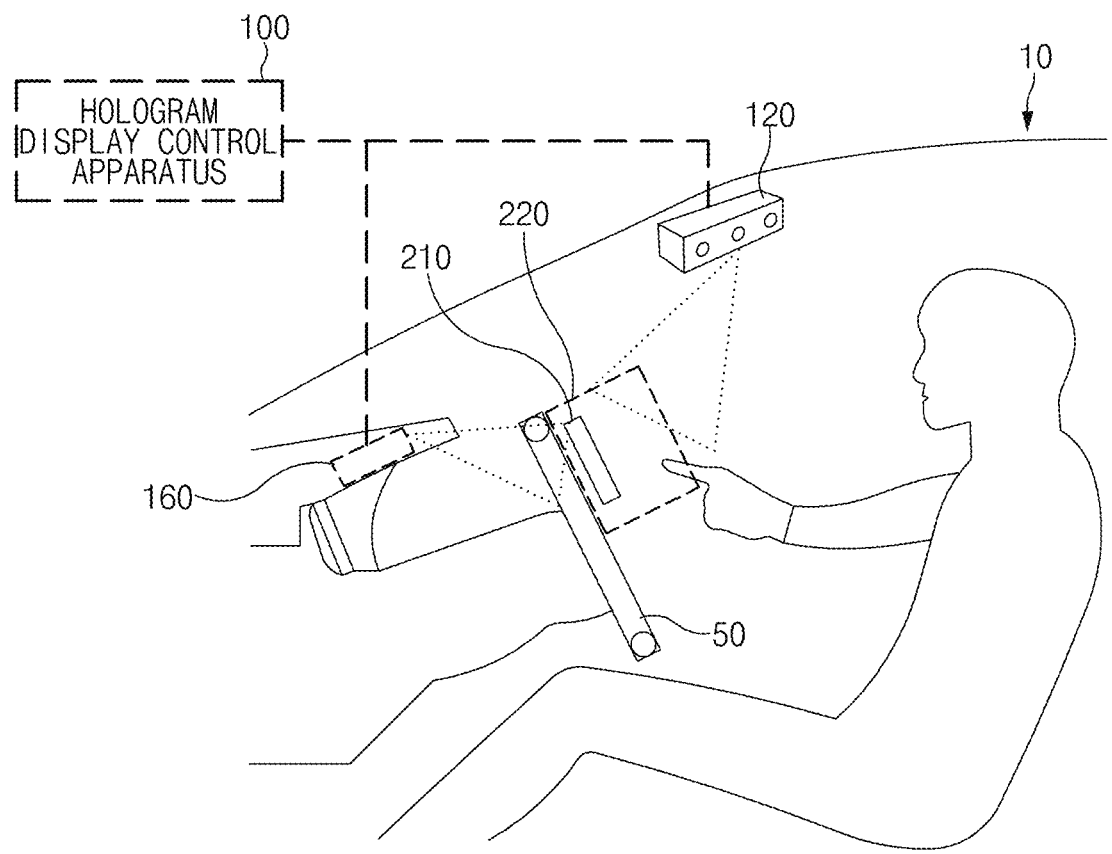
FIG. 1 is a view illustrating a vehicle system to which a hologram display control device is applied, according to an exemplary embodiment of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be in part determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, exemplary embodiments of the present invention will be described in detail with reference to the accompanying drawings. In the drawings, the same reference numerals will be used throughout to designate the same or equivalent elements. In addition, a detailed description of well-known features or functions will be ruled out in order not to unnecessarily obscure the gist of the present invention.

In describing elements of exemplary embodiments of the present invention, the terms 1st, 2nd, first, second, A, B, (a), (b), and the like may be used herein. These terms are only used to distinguish one element from another element, but do not limit the corresponding elements irrespective of the order or priority of the corresponding elements. Unless otherwise defined, all terms used herein, including technical or scientific terms, have the same meanings as those generally understood by those skilled in the art to which the present invention pertains. It will be understood that terms used herein should be interpreted as having a meaning that is consistent with their meaning in the context of this disclosure and the relevant art and will not be interpreted in an idealized or overly formal sense unless expressly so defined herein.

FIG. 1 is a view illustrating a vehicle system to which a hologram display control apparatus is applied, according to an exemplary embodiment of the present invention.

Referring to FIG. 1, a vehicle system according to an exemplary embodiment of the present invention may include driving devices driven by a manipulating device included in a steering wheel 50 and a hologram display control apparatus 100 that recognizes a button manipulated by recognizing an operation of a user with respect to a hologram image of a manipulating device of the steering wheel 50 and outputs a control signal to a driving device corresponding to the manipulated button. Here, the user may be a driver.

When an input signal of the user is received, the hologram display control apparatus 100 projects a hologram image associated with a manipulating device of the steering wheel 50 onto a predefined first area 210 of a vehicle 10 through a hologram projection device 160 by turning on a hologram display control function. Here, the input signal of the user may be a signal for entering a mode for automatic control of the steering wheel 50 including a signal for entering an autonomous driving mode of the vehicle 10 or a signal for entering an automatic parking mode.

When the autonomous driving mode or the automatic parking mode is entered, an autonomous driving control system or an automatic parking control system of the vehicle 10 automatically manipulates the steering wheel 50 depending on a set condition. Accordingly, in the case where the steering wheel 50 is automatically manipulated, to solve the issue that it is difficult for the user to manipulate the manipulating device of the steering wheel 50, the hologram display control apparatus 100 of a vehicle system according to an exemplary embodiment of the present invention may project a hologram image corresponding to an image of the manipulating device of the steering wheel 50 onto the first area 210 and may recognize a manipulation button on the hologram image by recognizing an operation of the user on a second area 220 including the first area 210 through a detector 120. Here, the second area 220 may indicate an area in which a predefined operation is recognized based on a space coordinate system of the vehicle 10.

Accordingly, even while the steering wheel 50 is automatically manipulated during autonomous driving, the vehicle system according to an exemplary embodiment of the present invention may allow the manipulating device of the steering wheel 50 to be manipulated through the hologram image.

When the vehicle 10 enters a driver driving mode, the hologram display control apparatus 100 may turn off the hologram display control function. The entrance to the driver driving mode may be made when a condition for cancellation of the entrance to the autonomous driving mode or the automatic parking mode is satisfied or by a request of the user.

Here, the hologram display control apparatus 100 may be implemented in the vehicle 10. For example, the hologram display control apparatus 100 may be implemented at a periphery of the steering wheel 50. At the present time, the hologram display control apparatus 100 may be integrally formed with internal control devices of the vehicle 10. The hologram display control apparatus 100 may be implemented with a separate device and may be connected to control devices of the vehicle 10 by a separate connection means. In addition, the hologram display control apparatus 100 may operate in conjunction with the autonomous driving control system and/or the automatic parking control system of the vehicle 10.

Figure 2:
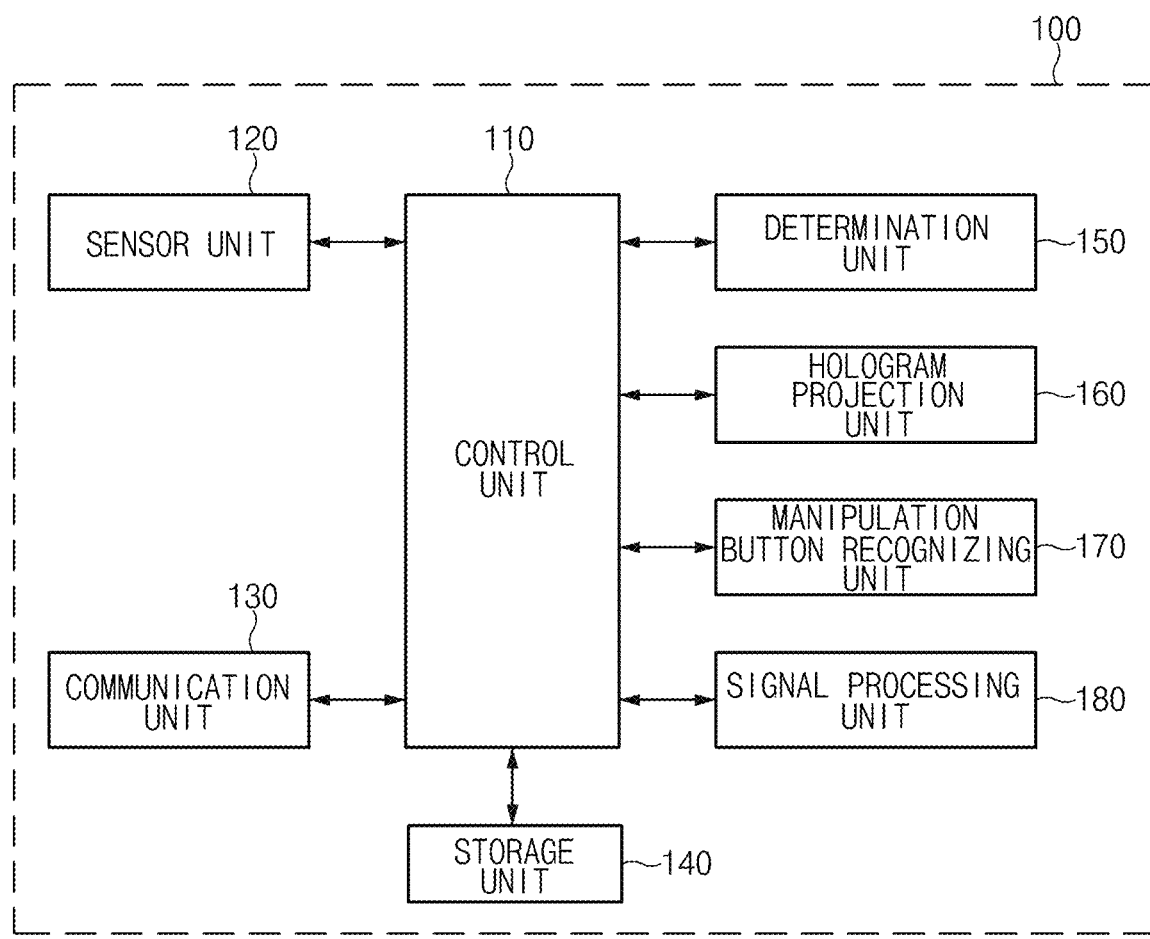
FIG. 2 is a block diagram illustrating a configuration of a hologram display control apparatus, according to an exemplary embodiment of the present invention.

Accordingly, detailed descriptions about the hologram display control apparatus 100 will be provided in detail with reference to FIG. 2.

FIG. 2 is a block diagram illustrating a configuration of a hologram display control apparatus, according to an exemplary embodiment of the present invention.

Referring to FIG. 2, the hologram display control apparatus 100 may include a control device 110, the detector 120, a communication device 130, a storage device 140, a determination device 150, the hologram projection device 160, a manipulation button recognizing device 170, and a signal processing device 180. Here, the control device 110 may process a signal configured to be transmitted between elements of the hologram display control apparatus 100.

In the case where a hologram display control function is turned on depending on an input signal of a user, the detector 120 may include one or more sensors, each of which recognizes an operation of the user with respect to a hologram image of a manipulating device of the steering wheel 50. Here, a 3D vision detector or a stereo camera having a function to irradiate an infrared ray may correspond to one of the sensors. In addition, it is reasonable that any detector configured for recognizing the predefined hand motion of the user in addition to the above-described detectors is applied to the detector 120.

The detector 120 may recognize the location of the user's hand in the second area 220 defined based on a space coordinate system of the vehicle 10. In addition, the detector 120 may recognize the predefined hand motion, for example, a touch operation, in the second area 220. At the present time, the detector 120 may transmit coordinate information related to the location of the user's hand recognized in the second area 220 or a location where the predefined hand motion is recognized in the second area 220, to the control device 110 and/or the manipulation button recognizing device 170.

Here, the second area 220 may include the first area 210 onto which the hologram image corresponding to the manipulating device of the steering wheel 50 is projected. The first area 210 and the second area 220 may be defined as an area, which is reachable by the user's hand, of an upper area of the steering wheel 50. For example, each of the first area 210 and the second area 220 may be defined as one area of an upper end side of the steering wheel 50. For another example, the first area 210 and the second area 220 may be defined as one area of the center location of the steering wheel 50. At the present time, the locations of the first area 210 and the second area 220 may be adjusted depending on information related to user's body shape.

Furthermore, the detector 120 may be disposed in the vehicle 10 and may be disposed such that a range in which a detector recognizes an operation includes the second area 220. For example, the detector 120 may be disposed in a rear view mirror of the vehicle 10 or at a periphery of the room mirror.

The communication device 130 may include a communication module supporting a communication interface with automotive equipment parts included in the vehicle 10, a control system, and/or control devices. For example, the communication module may communicate with driving devices driven by the manipulating device of the steering wheel 50 included in the vehicle 10 and may transmit a manipulation control signal of a button, which is verified by recognizing an operation on the second area 220 based on the hologram image projected onto the first area 210, to the corresponding driving device.

Here, the communication module may include a module supporting vehicle network communication including controller area network (CAN) communication, local interconnect network (LIN) communication, or Flex-Ray communication.

Also, the communication module may receive data used to project the hologram image and data used to recognize an operation of the user from an external device and may store the data in the storage device 140.

Here, the communication module may include a module for connecting wireless Internet or a module for short range communication. Wireless Internet technology may include Wireless LAN (WLAN), Wireless Broadband (Wibro), wireless-fidelity (Wi-Fi), or World Interoperability for Microwave Access (Wimax). Short range communication may include Bluetooth, ZigBee, Ultra Wideband (UWB), Radio Frequency Identification (RFID), or Infrared Data Association (IrDA).

The storage device 140 may store data and/or an algorithm necessary for the hologram display control apparatus 100 to operate.

For example, the storage device 140 may store an image corresponding to the manipulating device of the steering wheel 50 and may store an instruction and/or an algorithm for projecting the image corresponding to the manipulating device of the steering wheel 50 as a hologram image onto the first area 210. In addition, the storage device 140 may store a space coordinate system of the vehicle 10 and coordinate information related to the first area 210 and the second area 220 defined based on a space coordinate system of the vehicle 10 and may store coordinate information corresponding to the location of each button in the hologram image projected to the first area 210 based on space coordinates of the first area 210 and the second area 220. Moreover, the storage device 140 may store an instruction and/or an algorithm for recognizing the location of the hand and/or the hand motion of the user in the second area 220.

Here, the storage device 140 may include a storage medium including a random access memory (RAM), a static random access memory (SRAM), a read-only memory (ROM), a programmable read-only memory (PROM), or an electrically erasable programmable read-only memory (EEPROM).

The determination device 150 monitors a state where a driving mode, for example, an autonomous driving mode, an automatic parking mode, and a driver driving mode, of the vehicle 10 is entered. At the present time, when the input signal of the user for entering the autonomous driving mode or the automatic parking mode is received, the determination device 150 may turn on the hologram display control function. In the meantime, when the driver driving mode is entered in a state where the hologram display control function is turned on, the determination device 150 may turn off the hologram display control function.

When the hologram display control function is turned on by the determination device 150, the hologram projection device 160 projects the hologram image to a specified area, that is, the first area 210 and/or the second area 220, on the space coordinate system of the vehicle 10.

When the hologram display control function is turned on by the determination device 150, the hologram projection device 160 calls an image, which is stored in the storage device 140, of the manipulating device of the steering wheel 50 and projects a hologram image (hereinafter referred to as a "first hologram image"), which corresponds to the called image of the manipulating device of the steering wheel 50, onto the first area 210 defined based on the space coordinate system of the vehicle 10. Here, the hologram image includes an image of each button included in the manipulating device of the steering wheel 50.

The hologram projection device 160 may project a hologram image (hereinafter referred to as a "second hologram image") for notifying the user of the location of the second area 220 onto the second area 220 based on the coordinate information related to the second area 220 defined based on the space coordinate system of the vehicle 10. At the present time, since the second area 220 includes the first area 210, the second hologram image may be projected such that the first hologram image is superimposed in the second hologram image.

Figure 3A:
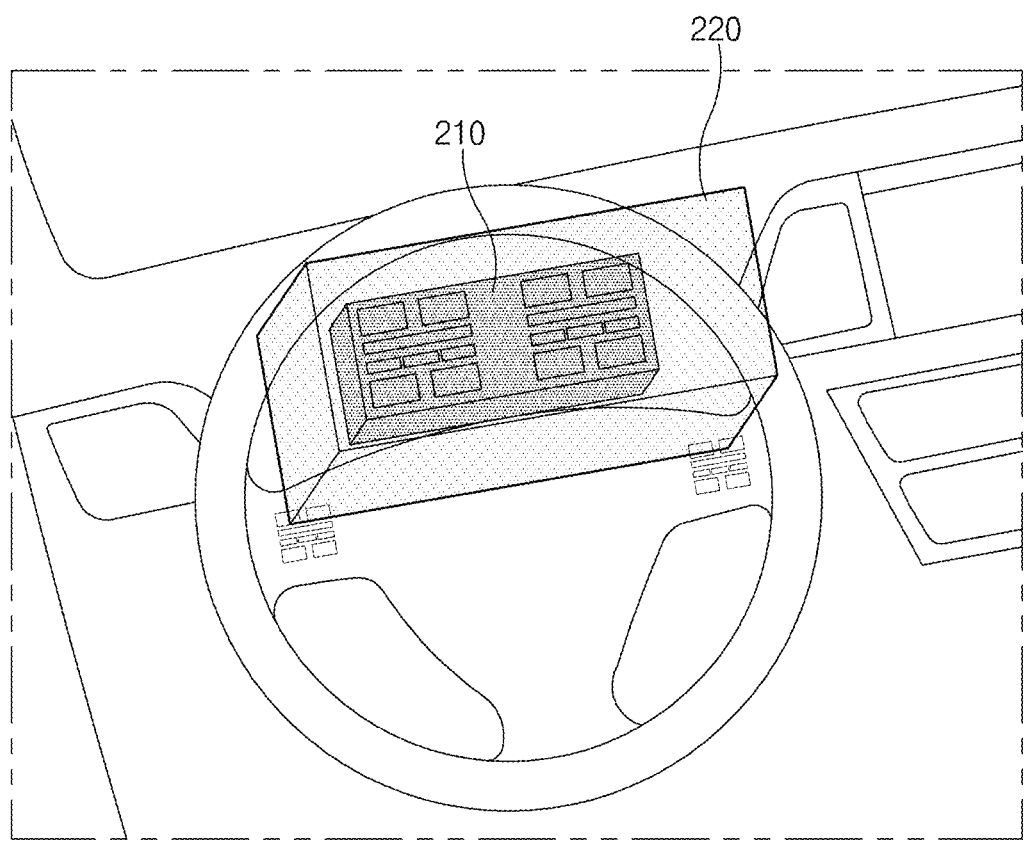
FIG. 3A, FIG. 3B, FIG. 3C, FIG. 4A, FIG. 4B, and FIG. 5 are views illustrating embodiments used to describe an operation of a hologram display control apparatus, according to an exemplary embodiment of the present invention.
Figure 3B:
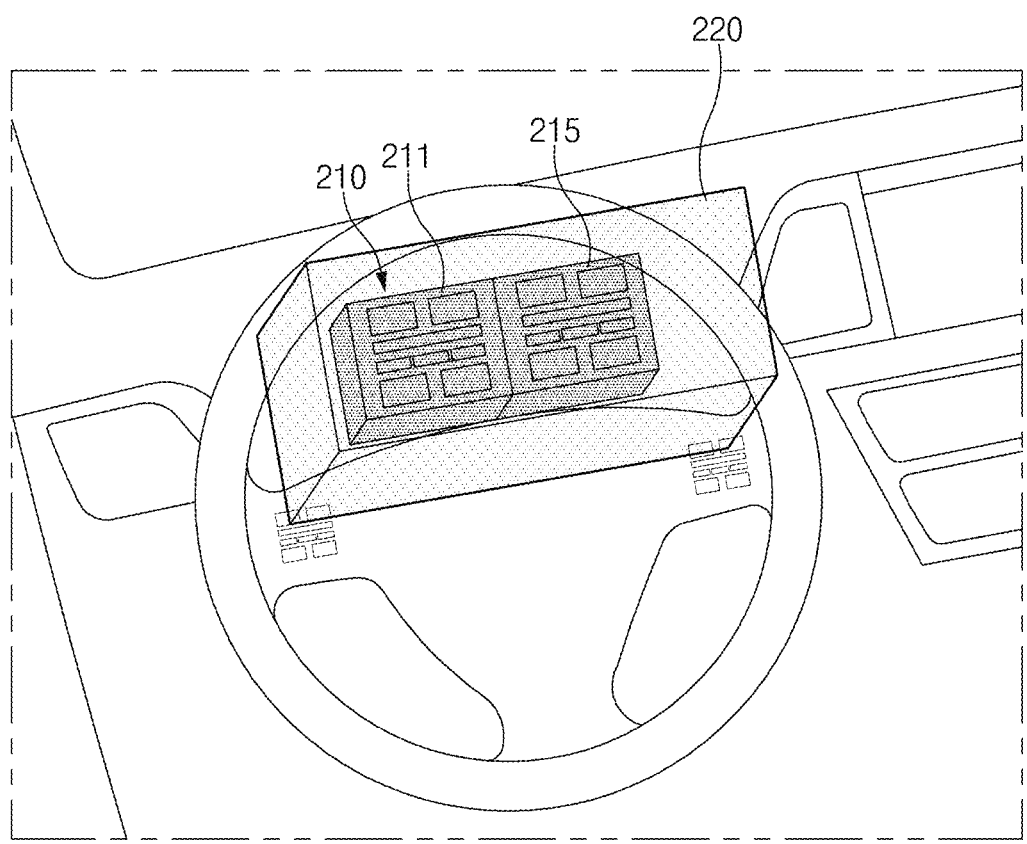
Figure 3C:
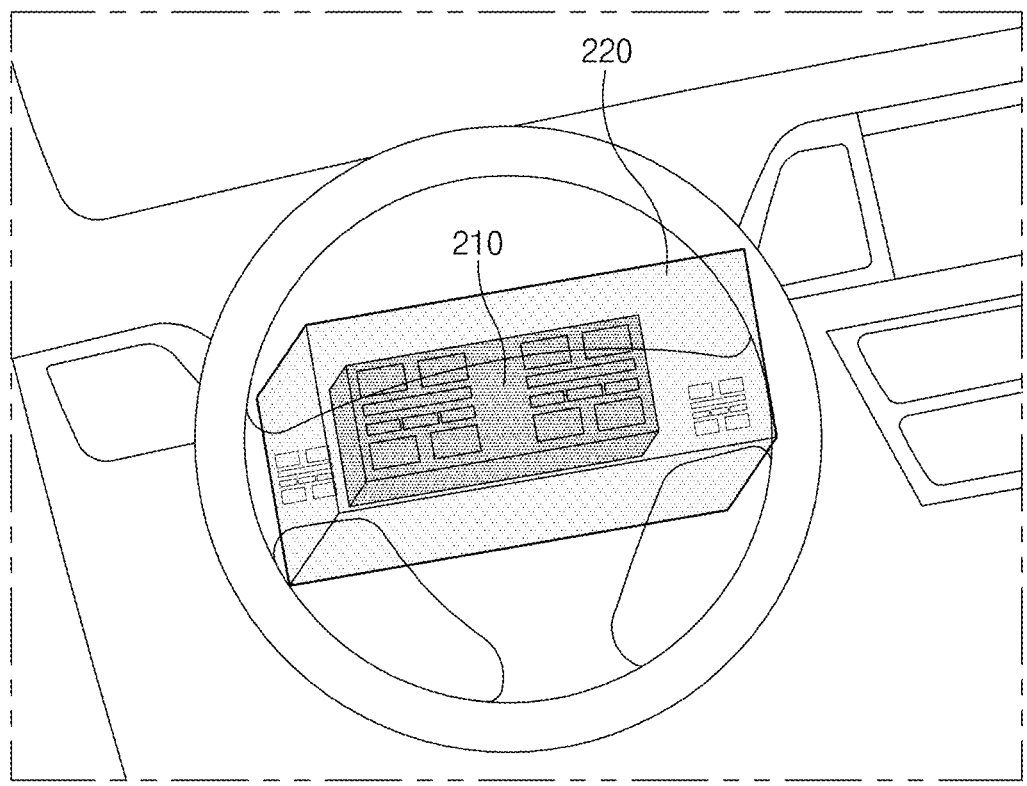

An exemplary embodiment in which the first hologram image and the second hologram image are projected onto the first area 210 and the second area 220 refers to FIG. 3A, FIG. 3B and FIG. 3C.

FIG. 3A illustrates a first hologram image and a second hologram image, according to various exemplary embodiments. Referring to FIG. 3A, the first hologram image may be projected onto the first area 210 in a form of one hologram image corresponding to an image of a manipulating device of the steering wheel 50. In the instant case, the first hologram image may include the same button as the manipulating device implemented in the steering wheel 50, and each button in the hologram image may have specified coordinate information in the first area 210.

In addition, the second hologram image is an image, which is projected onto the second area 220, for notifying a user of the second area 220.

FIG. 3B illustrates a first hologram image and a second hologram image, according to various exemplary embodiments. Referring to FIG. 3B, the first hologram image may include a first image 211 corresponding to each button included in a left-side manipulating device of the steering wheel 50 and a second image 215 corresponding to each button included in a right-side manipulating device.

At the present time, locations at which the first image 211 and the second image 215 are projected in the first area 210 may not overlap with each other. Furthermore, a left-side image and a right-side image of the first hologram image and each button in the left-side image and the right-side image may have specified coordinate information in the first area 210.

In addition, the second hologram image is an image, which is projected onto the second area 220, for notifying a user of the second area 220. At the present time, the second area 220 includes the first area 210. Accordingly, the second hologram image may be projected such that the left-side image and the right-side image of the first hologram image are superimposed in the second hologram image.

Here, the hologram projection device 160 may correspond to any device configured for projecting the first hologram image and/or the second hologram image onto the first area 210 and/or the second area 220. For example, the hologram projection device 160 may include a lenticular display.

The location at which the hologram image is projected may be defined based on one or more of a panel size, a resolution, a pixel structure, a pixel pitch, a viewing distance, a focal length, a viewing distance based on both eyes, a lens pitch, and viewing angle of the lenticular display.

For example, as illustrated in FIG. 3A and FIG. 3B, the location of the first area 210 and/or the second area 220 onto which the hologram image is projected may be defined as a location of an upper end portion of the steering wheel 50.

In the meantime, FIG. 3C illustrates a first hologram image and a second hologram image, according to various exemplary embodiments. As illustrated in FIG. 3C, the location of the first area 210 and/or the second area 220 onto which the hologram image is projected may be defined as a location of the center of the steering wheel 50.

The hologram projection device 160 may be disposed in the vehicle 10, and may be disposed at a location at which the hologram image is projected onto the first area 210 and/or the second area 220 specified based on a space coordinate system of the vehicle 10. An exemplary embodiment according to a location at which the hologram projection device 160 is disposed refers to FIG. 4A and FIG. 4B.

Figure 4A:
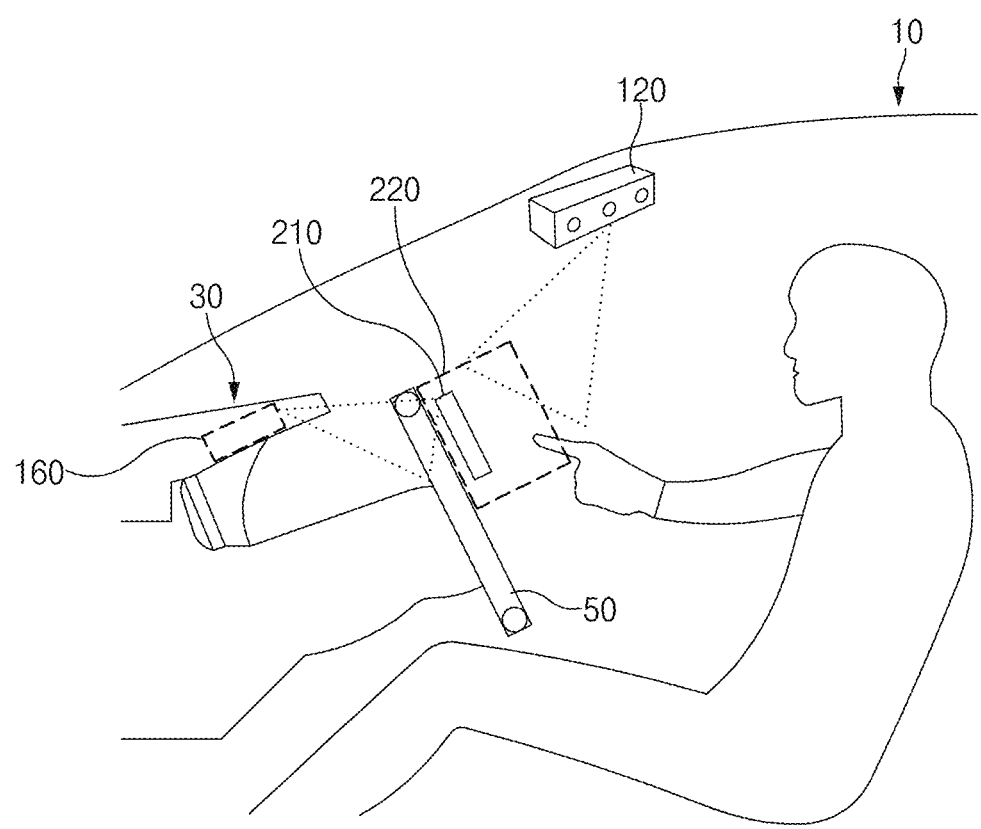

FIG. 4A illustrates a view in which a hologram projection device is disposed, according to various exemplary embodiments. Referring to FIG. 4A, the hologram projection device 160 may be disposed in a cluster 30 in front of a driver seat.

In the instant case, even though the steering wheel 50 is automatically manipulated under control of an autonomous driving control system or an automatic parking control system, the hologram projection device 160 may project a hologram image onto the predetermined first area 210 and/or the predetermined second area 220.

Figure 4B:
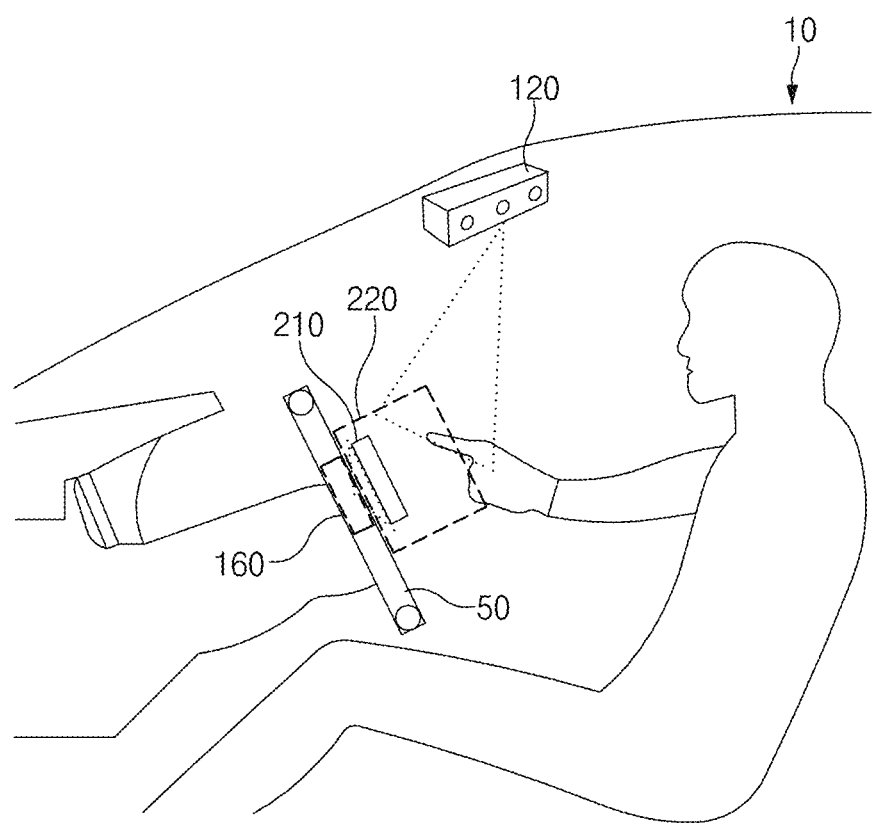

Meanwhile, FIG. 4B illustrates a view in which a hologram projection device is disposed, according to various exemplary embodiments. Referring to FIG. 4B, the hologram projection device 160 may be disposed in the steering wheel 50. In the instant case, since the steering wheel 50 rotates under control of an autonomous driving control system or an automatic parking control system, the hologram projection device 160 may be disposed at a location of the center of the steering wheel 50, which is not changed, even though the steering wheel 50 rotates.

In contrast, the location where the hologram projection device 160 is disposed is not limited to the embodiment. However, it is reasonable that the hologram projection device 160 is configured for being disposed at any fixed location at which the hologram image is projected onto the first area 210 and/or the second area 220.

When information related to the recognition of an operation in the second area 220 is received from the detector 120 in a state where a first hologram image is projected onto the first area 210, the manipulation button recognizing device 170 may call coordinate information related to each button in the first hologram image from the storage device 140. In addition, the information related to the recognition of the operation received from the detector 120 includes coordinate information related to a location at which user's hand or predefined hand motion is recognized in the second area 220.

The manipulation button recognizing device 170 may recognize a button manipulated by the user by comparing the coordinate information related to each button in the first hologram image with the coordinate information related to a location at which the operation is recognized in the second area 220. Accordingly, the manipulation button recognizing device 170 transmits information related to the recognized manipulation button to the control device 110 and/or the signal processing device 180.

When the information related to the manipulation button is received from the control device 110 or the manipulation button recognizing device 170, the signal processing device 180 may transmit a manipulation control signal of the corresponding button to the corresponding driving device through the communication device 130. For example, in the case where a button recognized by the manipulation button recognizing device 170 is a music playing button, the signal processing device 180 may transmit a music playing control signal to an audio system of the vehicle 10. Meanwhile, in the case where a button recognized by the manipulation button recognizing device 170 is a voice recognition button, the signal processing device 180 may transmit a control signal for starting voice recognition to a voice recognition system of the vehicle 10.

Figure 5:
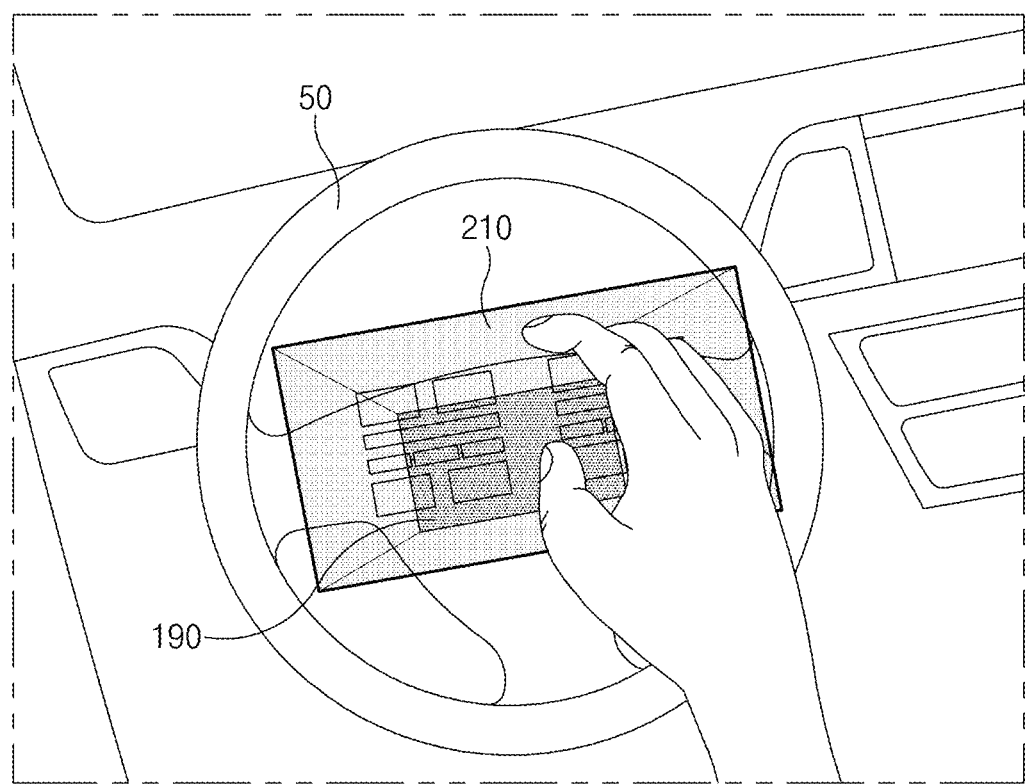

FIG. 5 is a view illustrating another exemplary embodiment in which a hologram display control apparatus provides a hologram image, according to an exemplary embodiment of the present invention.

Referring to FIG. 5, the hologram display control apparatus may further include an ultrasonic generator 190 that provides a haptic effect of a hologram image.

In the case where a first hologram image is projected onto the first area 210 by the hologram projection device 160, the ultrasonic generator 190 may provide a haptic function with respect to the first hologram image by generating an ultrasonic wave with respect to the first area 210. At the present time, the ultrasonic generator 190 may be disposed at the center location of the steering wheel 50.

In the case of a conventional technology that implements a manipulating device by use of hologram, since the function of the corresponding button is performed by tracing hand motion of a user with respect to a hologram image and not actually manipulating a button, there is no a haptic feedback according to a button manipulation.

Accordingly, as in the exemplary embodiment in FIG. 5, the hologram display control apparatus according to an exemplary embodiment of the present invention may provide the haptic feedback according to the button manipulation of a hologram image to the user, increasing the satisfaction of the user.

Figure 6:
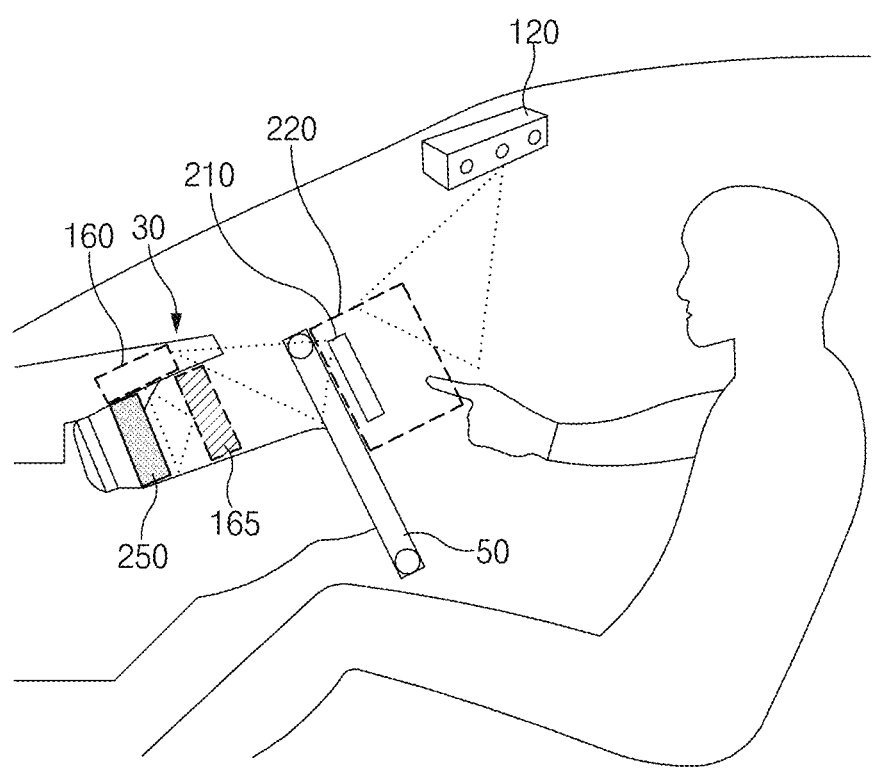
FIG. 6, FIG. 7A and FIG. 7B are views illustrating a vehicle system to which a hologram display control apparatus is applied, according to another exemplary embodiment of the present invention.

FIG. 6 is a view illustrating a vehicle system to which a hologram display control apparatus is applied, according to another exemplary embodiment of the present invention.

Referring to FIG. 6, the vehicle system according to another exemplary embodiment of the present invention is a system in which an element providing a hologram image of the cluster 30 is added to the vehicle system of FIG. 1. Accordingly, the hologram display control apparatus 100 according to another exemplary embodiment of the present invention may include all the elements of FIG. 2. However, the hologram projection device 160 may further include a cluster image projection device 165 that projects a hologram image of the cluster 30 (hereinafter referred to as a "third hologram image") onto a predefined third area 250.

Here, the third area 250 may be defined as a front surface of the cluster 30 in front of a driver seat, and the third hologram image may be a hologram image corresponding to a screen image of the cluster 30.

Figure 7A:
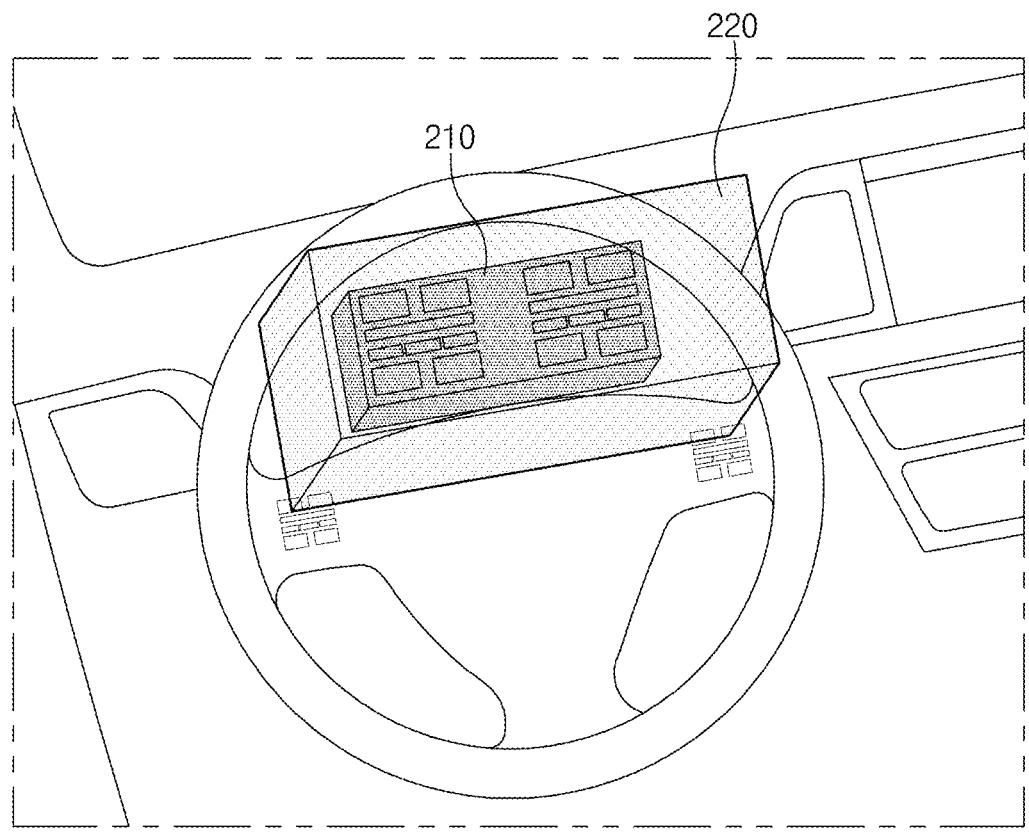
Figure 7B:
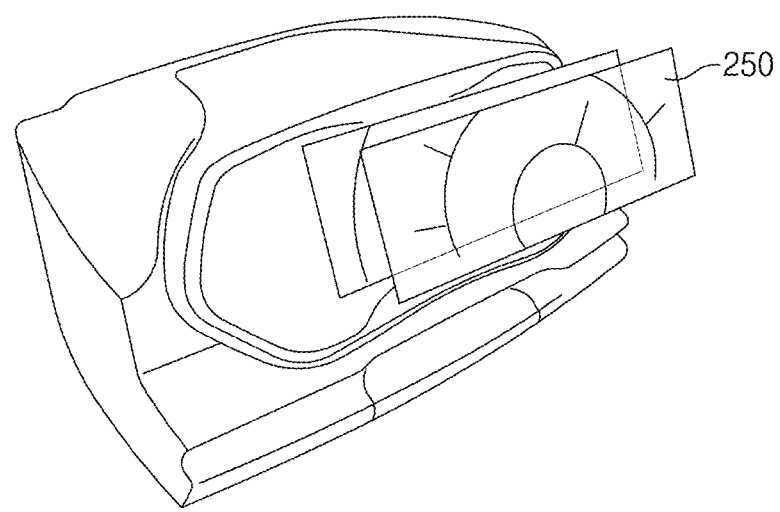

In the instant case, referring to FIG. 7A, the hologram display control apparatus 100 according to another exemplary embodiment of the present invention may project a hologram image for button manipulation onto the first area 210 and/or the second area 220 of the upper portion of the steering wheel 50 of the vehicle 10 during autonomous driving such that the button manipulation is possible through recognizing an operation. At the same time, referring to FIG. 7B, the hologram display control apparatus 100 according to another exemplary embodiment of the present invention may project a hologram image corresponding to a screen image of the cluster 30 onto the third area 250 of the front surface of the cluster 30, increasing the visibility of the user.

The operation flow of the apparatus according to an exemplary embodiment of the present invention will be described in more detail as follows.

Figure 8:
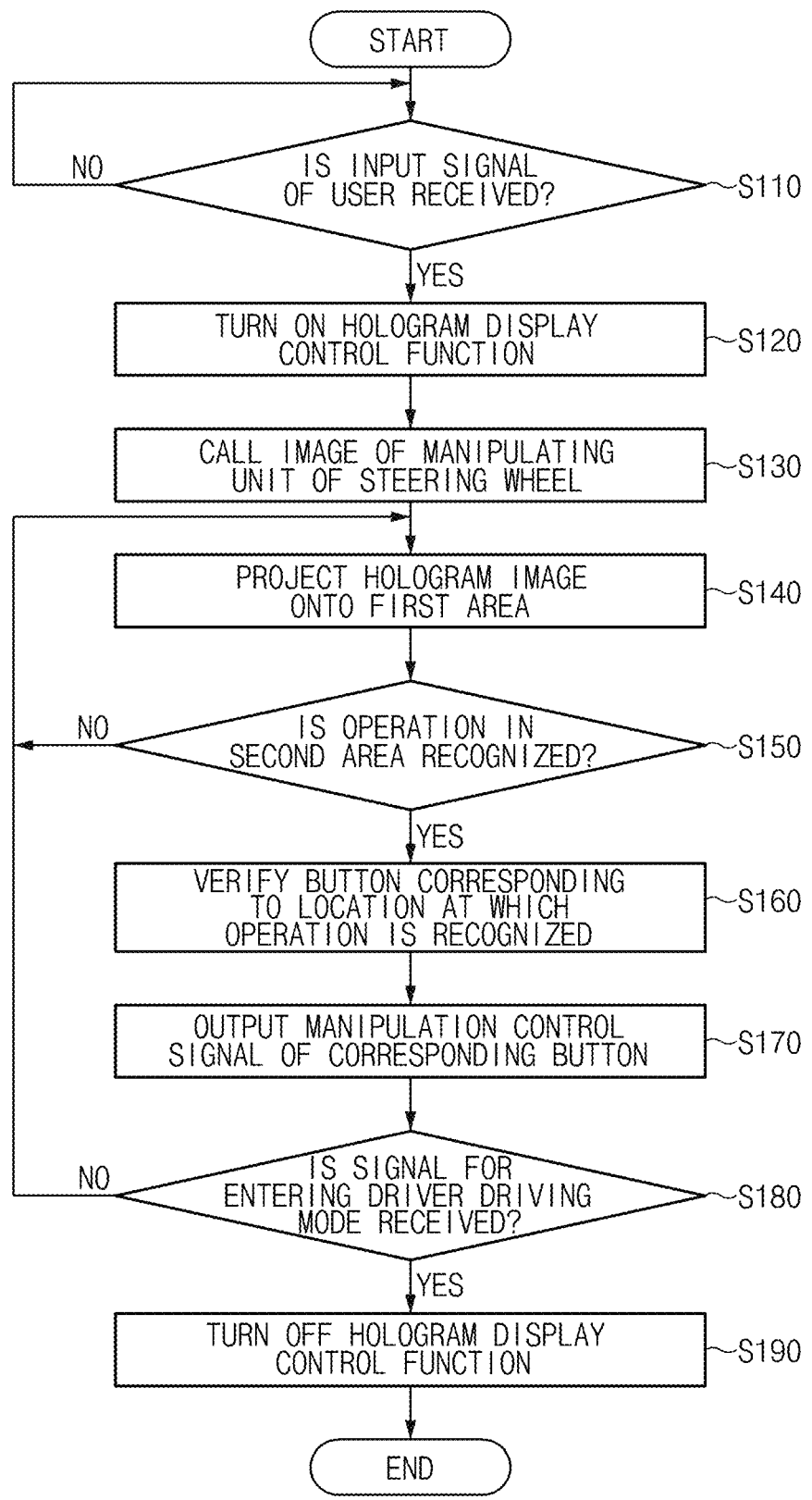
FIG. 8 is a flowchart illustrating an operation flow associated with a hologram display control method, according to an exemplary embodiment of the present invention.

FIG. 8 is a flowchart illustrating an operation flow associated with a hologram display control method, according to an exemplary embodiment of the present invention.

Referring to FIG. 8, when an input signal of a user is received in operation S110, in operation S120, the hologram display control apparatus 100 may turn on a hologram display control function. Here, the input signal of the user may be a signal for entering a mode for automatic control of the steering wheel 50 including a signal for entering an autonomous driving mode of the vehicle 10 or a signal for entering an automatic parking mode of the vehicle 10.

When the hologram display control function is turned on, the hologram display control apparatus 100 calls an image, which is stored in advance, of a manipulating device of the steering wheel 50 in operation S130 and projects a first hologram image corresponding to the called image of the manipulating device of the steering wheel 50 onto the first area 210 defined based on a space coordinate system of the vehicle 10 in operation S140. Although not illustrated in FIG. 7A, and FIG. 7B, to recognize an operation, the hologram display control apparatus 100 may project a second hologram image for notifying a user of a location of the predefined second area 220 onto the second area 220.

Afterwards, when an operation of the user in the second area 220, for example, a location of a hand or the predefined hand motion, is recognized through a detector of the detector 120 in operation S150, in operation S160, the hologram display control apparatus 100 may verify a button manipulated by the user by comparing coordinate information related to each button in the first hologram image with coordinate information related to a location at which the operation is recognized in the second area 220.

At the present time, in operation S170, the hologram display control apparatus 100 may output a manipulation control signal corresponding to the button verified in operation S160. In the instant case, the hologram display control apparatus 100 may transmit the manipulation control signal to a driving device of the vehicle 10 operated by the corresponding button.

Operation S140 to operation S170 of FIG. 8 may be repeatedly performed until a request to enter a driver driving mode of the vehicle 10 occurs. When the vehicle 10 enters the driver driving mode in operation S180, the hologram display control apparatus 100 turns off a hologram display control function in operation S190 and end portions a relevant operation.

As described above, the hologram display control apparatus 100 according to an exemplary embodiment of the present invention may be implemented with an independent hardware device including a memory and a processor processing each operation or may be implemented to be included in another hardware device including a microprocessor or a general-purpose computer system. In addition, the control device 110, the determination device 150, the hologram projection device 160, the manipulation button recognizing device 170, and the signal processing device 180 of the hologram display control apparatus 100 according to an exemplary embodiment of the present invention may be implemented with at least one or more processors.

Figure 9:
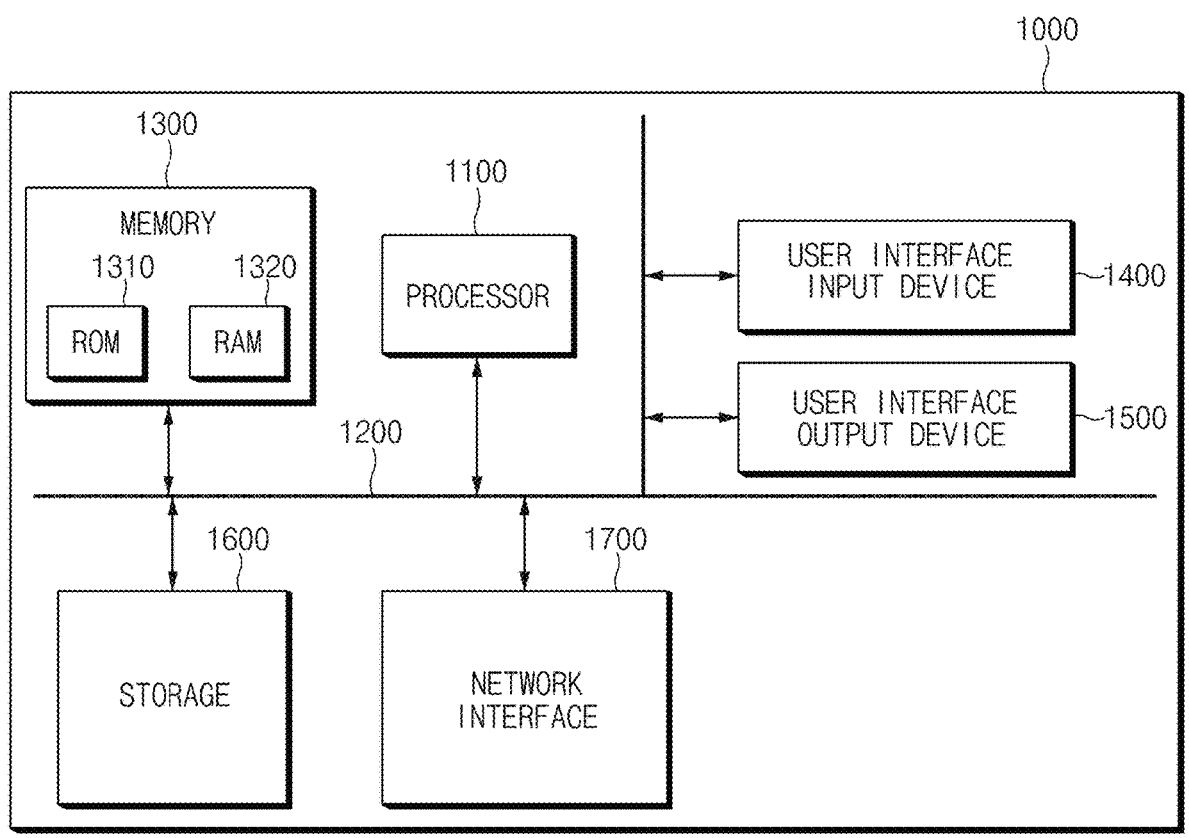
FIG. 9 is a block diagram illustrating a computing system in which a hologram display control method is performed, according to an exemplary embodiment of the present invention.

FIG. 9 is a block diagram illustrating a computing system in which a hologram display control method is performed, according to an exemplary embodiment of the present invention.

Referring to FIG. 9, a computing system 1000 may include at least one processor 1100, a memory 1300, a user interface input device 1400, a user interface output device 1500, a storage 1600, and a network interface 1700, which are connected to each other via a bus 1200.

The processor 1100 may be a central processing unit (CPU) or a semiconductor device that processes instructions stored in the memory 1300 and/or the storage 1600. Each of the memory 1300 and the storage 1600 may include various types of volatile or non-volatile storage media. For example, the memory 1300 may include a read only memory (ROM) and a random access memory (RAM).

Thus, the operations of the methods or algorithms described with reference to the embodiments included in the specification may be directly implemented with a hardware module, a software module, or combinations thereof, executed by the processor 1100. The software module may reside on a storage medium (e.g., the memory 1300 and/or the storage 1600) including a RAM, a flash memory, a ROM, an erasable and programmable ROM (EPROM), an electrically EPROM (EEPROM), a register, a hard disc, a removable disc, or a compact disc-ROM (CD-ROM). The storage medium may be coupled to the processor 1100. The processor 1100 may read out information from the storage medium and may write information in the storage medium. Alternatively, the storage medium may be integrated with the processor 1100. The processor and storage medium may reside in an application specific integrated circuit (ASIC). The ASIC may reside in a user terminal. Alternatively, the processor and storage medium may reside as a separate component in the user terminal.

According to an exemplary embodiment of the present invention, a hologram image associated with a manipulating device of the steering wheel is provided when a mode for automatic control of the steering wheel of a vehicle is entered, and the manipulated button is recognized through recognizing an operation, easily manipulating a button included in a steering wheel even during automatic control of the steering wheel to increase the convenience of a user.

According to an exemplary embodiment of the present invention, each of the hologram image associated with the manipulating device of the steering wheel and a hologram image corresponding to a cluster screen is provided when the mode for automatic control of the steering wheel of the vehicle is entered, increasing the visibility of the user.

Hereinabove, although the present invention has been described with reference to exemplary embodiments and the accompanying drawings, the present invention is not limited thereto, but may be variously modified and altered by those skilled in the art to which the present invention pertains without departing from the spirit and scope of the present invention claimed in the following claims.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A hologram display control apparatus comprising:
   a determination device configured to turn on a hologram display control depending on an input signal of a user;
   a hologram projection device configured to project a first hologram image corresponding to an image of a manipulating device of a steering wheel onto a first area predefined based on a space coordinate system of a vehicle, when the hologram display control is turned on;
   a detector configured to recognize a set operation of the user in a second area predefined for operation recognition with respect to button manipulation in the first hologram image;
   a manipulation button recognizing device configured to recognize a manipulation button in the first hologram image based on a location at which the set operation of the user is recognized by the detector; and
   a signal processing device configured to transmit a control signal to a driving device of the vehicle, the driving device operated by the recognized manipulation button,
   wherein the manipulation button recognizing device recognizes the manipulation button by comparing coordinate information corresponding to a location of each button in the first hologram image with coordinate information related to a location at which the set operation is recognized in the second area,
   wherein the hologram projection device includes a lenticular display, and projects the first hologram image at a location defined based on one or more of a panel size, a resolution, a pixel structure, a pixel pitch, a viewing distance, a focal length, a viewing distance based on both eyes, a lens pitch, and a viewing angle of the lenticular display, and
   wherein the location onto which the first hologram image is projected is defined as a location of an upper end portion or a center of the steering wheel.

2. The hologram display control apparatus of claim 1, wherein the input signal of the user includes a signal for entering an autonomous driving mode of the vehicle.

3. The hologram display control apparatus of claim 1, wherein the input signal of the user includes a signal for entering an automatic parking mode of the vehicle.

4. The hologram display control apparatus of claim 1, wherein the second area includes the first area.

5. The hologram display control apparatus of claim 1, wherein each of the first area and the second area is defined as an upper portion of the steering wheel.

6. The hologram display control apparatus of claim 1, further including:
   a storage device in which coordinate information corresponding to the location of each button in the first hologram image is stored based on space coordinates of the first area and the second area.

7. The hologram display control apparatus of claim 1, wherein the first hologram image includes an image corresponding to each button included in a first-side manipulating device and a second-side manipulating device of the steering wheel.

8. The hologram display control apparatus of claim 1, wherein the first hologram image includes a first image corresponding to each button included in a first-side manipulating device of the steering wheel and a second image corresponding to each button included in a second-side manipulating device of the steering wheel,
  wherein the first image and the second image are projected not to overlap in the first area.

9. The hologram display control apparatus of claim 1, wherein the hologram projection device is disposed in a cluster in a front of a driver seat in the vehicle.

10. The hologram display control apparatus of claim 1, wherein the hologram projection device is disposed at a center location of the steering wheel.

11. The hologram display control apparatus of claim 10, wherein each of the first area and the second area is defined as a predetermined area in which a projection location of the hologram projection device is fixed during rotation motion of the steering wheel.

12. The hologram display control apparatus of claim 1, wherein the hologram projection device projects a second hologram image for notifying the user of a location of the second area onto the second area, and
  wherein the second hologram image is projected, and wherein the first hologram image is superimposed in the second hologram image.

13. The hologram display control apparatus of claim 1, wherein the hologram projection device includes a cluster image projection device configured to project a third hologram image corresponding to a screen image of a cluster in a front of a driver seat in the vehicle onto a third area predefined at a location of a front surface of the cluster.

14. The hologram display control apparatus of claim 1, wherein the determination device turns off the hologram display control when the vehicle enters a driver driving mode.

15. A hologram display control method, the method comprising:
  turning on a hologram display control depending on an input signal of a user;
  projecting a first hologram image corresponding to an image of a manipulating device of a steering wheel onto a first area predefined based on a space coordinate system of a vehicle, when the hologram display control is turned on;
  recognizing a set operation of the user in a second area predefined for operation recognition with respect to button manipulation in the first hologram image;
  recognizing a manipulation button in the first hologram image based on a location at which the set operation of the user is recognized; and
  transmitting a control signal to a driving device of the vehicle, the driving device operated by the recognized manipulation button,
  wherein the recognizing of the manipulation button includes:
    comparing coordinate information corresponding to a location of each button in the first hologram image with coordinate information related to a location at which the set operation is recognized in the second area; and
    recognizing the manipulation button depending on the comparison result,
  wherein the hologram device includes a lenticular display, and the first hologram image is projected at a location defined based on one or more of a panel size, a resolution, a pixel structure, a pixel pitch, a viewing distance, a focal length, a viewing distance based on both eyes, a lens pitch, and a viewing angle of the lenticular display, and
  wherein the location onto which the first hologram image is projected is defined as a location of an upper end portion or a center of the steering wheel.

16. The method of claim 15, wherein the input signal of the user includes a signal for entering an autonomous driving mode of the vehicle.

17. The method of claim 15, wherein the input signal of the user includes a signal for entering an automatic parking mode of the vehicle.

18. The method of claim 15, wherein the second area includes the first area, and
  wherein each of the first area and the second area is defined as an upper portion of the steering wheel.

19. The method of claim 15, further including:
  storing coordinate information corresponding to the location of each button in the first hologram image based on space coordinates of the first area and the second area.

20. The method of claim 15, further including:
  projecting a second hologram image for notifying the user of a location of the second area onto the second area, when the hologram display control is turned on,
  wherein the second hologram image is projected, and wherein the first hologram image is superimposed in the second hologram image.

21. The method of claim 15, further including:
  projecting a third hologram image corresponding to a screen image of a cluster in a front of a driver seat in the vehicle onto a third area predefined at a location of a front surface of the cluster, when the hologram display control is turned on.

22. The method of claim 15, further including:
  turning off the hologram display control when the vehicle enters a driver riving mode.

23. A vehicle system comprising:
  one or more driving devices driven by a manipulating device included in a steering wheel of a vehicle; and
  a hologram display control apparatus configured to project hologram image corresponding to an image of the manipulating device of the steering wheel onto a first area predefined based on a space coordinate system of the vehicle after a hologram display control is turned on depending on an input signal of a user, to recognize a manipulation button in the hologram image depending on whether a set operation of the user is recognized in a second area predefined to include the first area, and to transmit a control signal to the driving devices driven by the recognized manipulation button,
  wherein the manipulation button is recognized by comparing coordinate information corresponding to a location of each button in the first hologram image with coordinate information related to a location at which the set operation is recognized in the second area,
  wherein the hologram display control apparatus includes a lenticular display, and projects the first hologram image at a location defined based on one or more of a panel size, a resolution, a pixel structure, a pixel pitch, a viewing distance, a focal length, a viewing distance based on both eyes, a lens pitch, and a viewing angle of the lenticular display, and
  wherein the location onto which the first hologram image is projected is defined as a location of an upper end portion or a center of the steering wheel.

24. The vehicle system of claim 23, wherein the input signal of the user includes a signal for entering an autonomous driving mode of the vehicle.

25. The vehicle system of claim 23, wherein the input signal of the user includes a signal for entering an automatic parking mode of the vehicle.

26. The vehicle system of claim 23, wherein the hologram display control apparatus turns off the hologram display control when the vehicle enters a driver driving mode.

* * * * *